(12) United States Patent
Koide et al.

(10) Patent No.: US 10,371,147 B2
(45) Date of Patent: Aug. 6, 2019

(54) ELECTRICALLY-DRIVEN COMPRESSOR

(71) Applicant: KABUSHIKI KAISHA TOYOTA JIDOSHOKKI, Kariya-shi, Aichi (JP)

(72) Inventors: Tatsuya Koide, Kariya (JP); Ken Suitou, Kariya (JP); Kazuya Kimura, Kariya (JP); Akio Fujii, Kariya (JP); Akihiko Taketani, Kariya (JP); Masao Iguchi, Kariya (JP); Kenji Mochizuki, Kariya (JP); Shingo Enami, Kariya (JP)

(73) Assignee: Kabushiki Kaisha Toyota Jidoshokki, Aichi-ken (JP)

(*) Notice: Subject to any disclaimer, the term of this patent is extended or adjusted under 35 U.S.C. 154(b) by 44 days.

(21) Appl. No.: 15/806,840

(22) Filed: Nov. 8, 2017

(65) Prior Publication Data

US 2018/0066659 A1 Mar. 8, 2018

Related U.S. Application Data

(62) Division of application No. 14/703,130, filed on May 4, 2015, which is a division of application No. (Continued)

(30) Foreign Application Priority Data

Jan. 25, 2006 (JP) ................................ 2006-016503
Jan. 25, 2007 (JP) ................................ 2007-014411

(51) Int. Cl.
*F16J 15/12* (2006.01)
*F04C 27/00* (2006.01)
(Continued)

(52) U.S. Cl.
CPC ............ *F04C 27/008* (2013.01); *F01C 21/10* (2013.01); *F04C 18/0215* (2013.01);
(Continued)

(58) Field of Classification Search
CPC ........ F16J 15/104; F16J 15/022; F16J 15/061; F16J 15/062; F16J 15/121; F16J 15/122;
(Continued)

(56) References Cited

U.S. PATENT DOCUMENTS 1,424,094 A * 7/1922 Gunn ........................ F16K 1/46
251/114
1,591,332 A * 7/1926 Mueller ................ E03C 1/0409
251/367

(Continued)

FOREIGN PATENT DOCUMENTS

EP 0 926 341 A2 6/1999
GB 2 003 334 A 3/1979
(Continued)

OTHER PUBLICATIONS

Office Action, dated Feb. 5, 2013 from corresponding Japanese Patent Application Serial No. 2007-014411.
(Continued)

*Primary Examiner* — Devon C Kramer
*Assistant Examiner* — Christopher S Bobish

(57) ABSTRACT

An electrically-driven compressor including a housing, an electric motor, a compression mechanism, a cover member, a motor drive circuit, and a sealing member is disclosed. The electric motor is accommodated in the housing. The compression mechanism is accommodated in the housing and operated by the electric motor. The cover member is attached to the housing. The housing and the cover member form an accommodation portion including an accommodation space therein. The motor drive circuit is accommodated in the accommodation space and drives the electric motor. The sealing member is arranged between the housing and the cover member to seal the accommodation space. The sealing member includes an elastic seal portion that comes into close contact with the housing and the cover member.

(Continued)

A core sustains the shape of the seal portion in conformance with the circumferential edge of the accommodation space. The core is formed so that at least a circumferential edge part of the core is in conformance with the circumferential edge of the accommodation space. The seal portion is formed integrally with the circumferential edge part of the shape sustaining member by depositing rubber material thereon.

12 Claims, 6 Drawing Sheets

Related U.S. Application Data

11/885,776, filed as application No. PCT/JP2007/051173 on Jan. 25, 2007.

(51) Int. Cl.
| | |
|---|---|
| F16J 15/10 | (2006.01) |
| F16J 15/02 | (2006.01) |
| F16J 15/06 | (2006.01) |
| H02K 5/22 | (2006.01) |
| F01C 21/10 | (2006.01) |
| F04C 18/02 | (2006.01) |

(52) U.S. Cl.
CPC .......... *F04C 27/003* (2013.01); *F16J 15/022* (2013.01); *F16J 15/061* (2013.01); *F16J 15/062* (2013.01); *F16J 15/104* (2013.01); *F16J 15/121* (2013.01); *F16J 15/122* (2013.01); *F16J 15/125* (2013.01); *H02K 5/22* (2013.01); *H02K 5/225* (2013.01); *F04C 2240/30* (2013.01); *F04C 2240/808* (2013.01)

(58) Field of Classification Search
CPC ...... F04B 53/16; F04C 27/003; F04C 27/008; H02K 5/22; H02K 5/225
USPC ..................... 417/423.14, 328; 277/642, 651
See application file for complete search history.

(56) References Cited

U.S. PATENT DOCUMENTS

| | | | | |
|---|---|---|---|---|
| 2,210,183 A * | 8/1940 | Schweighart | ...... | B65D 43/0214 206/557 |
| 2,365,048 A * | 12/1944 | Bruno | ................. | F16L 27/0828 174/153 R |
| 2,454,567 A * | 11/1948 | Pierson, Jr. | .......... | H04B 15/025 174/351 |
| 2,761,536 A * | 9/1956 | Bradley | ................. | B60J 10/365 277/312 |
| 3,153,541 A * | 10/1964 | Rudder | .................. | F16J 15/127 277/639 |
| 3,578,346 A * | 5/1971 | Jelinek | .................... | F16J 15/121 277/611 |
| 3,918,726 A * | 11/1975 | Kramer | .................. | F16J 15/166 277/651 |
| 4,345,739 A * | 8/1982 | Wheatley | ............... | F16J 15/022 251/358 |
| 4,361,348 A * | 11/1982 | Rapp | .................. | H05K 7/20145 277/632 |
| 4,535,999 A * | 8/1985 | Locacius | ................ | F16J 15/123 277/596 |
| 4,671,325 A * | 6/1987 | Otter | ........................ | F15B 1/22 138/30 |
| 4,854,476 A * | 8/1989 | Serio, Jr. | ................. | B65D 53/02 220/378 |
| 4,934,715 A * | 6/1990 | Johnson | .................. | E02D 29/14 220/378 |
| 4,963,778 A * | 10/1990 | Jensen | .................. | H02K 5/225 310/160 |
| 5,137,674 A * | 8/1992 | Braconier | ............... | B29C 45/14 264/160 |
| 5,145,190 A * | 9/1992 | Boardman | .............. | F16J 15/104 277/596 |
| 5,170,012 A * | 12/1992 | Braconier | ............... | B65D 53/00 174/535 |
| 5,209,845 A * | 5/1993 | Sims | ...................... | B01D 35/30 210/232 |
| 5,492,343 A * | 2/1996 | Smith | ..................... | F16J 15/127 277/638 |
| 5,564,714 A * | 10/1996 | Katsuno | .............. | B25B 27/0028 277/630 |
| 5,639,103 A * | 6/1997 | Jeanne | ................... | F16J 15/122 277/596 |
| 5,687,975 A * | 11/1997 | Inciong | .................. | F02F 7/006 277/591 |
| 5,794,947 A * | 8/1998 | Shimizu | ................. | F16J 15/061 277/630 |
| 6,107,716 A * | 8/2000 | Penketh | ................. | H02K 11/33 180/443 |
| 6,202,983 B1 * | 3/2001 | Hartman | ............... | F16J 15/061 137/15.18 |
| 6,436,509 B1 * | 8/2002 | Demaray | ............ | C23C 14/3407 118/733 |
| 6,530,575 B2 * | 3/2003 | Poquet | .................... | F02F 7/006 277/592 |
| 6,626,439 B1 * | 9/2003 | Forry | ..................... | F16J 15/104 277/592 |
| 6,737,579 B1 * | 5/2004 | Laufer | ................. | F02M 41/125 174/50.52 |
| 6,769,699 B2 * | 8/2004 | Seki | ..................... | G11B 33/121 277/628 |
| 6,808,372 B2 * | 10/2004 | Makino | .................. | F04C 28/08 417/410.1 |
| 6,938,879 B2 * | 9/2005 | Bancroft | ................ | F16J 15/164 251/306 |
| 7,029,013 B2 * | 4/2006 | Yajima | .................. | F16J 15/025 206/710 |
| 7,059,612 B2 * | 6/2006 | Kuribayashi | ......... | F16B 43/001 277/637 |
| 7,063,327 B2 * | 6/2006 | Salameh | ................ | F16J 15/064 277/590 |
| 7,112,045 B2 | 9/2006 | Kimura et al. | | |
| 7,393,188 B2 * | 7/2008 | Lawyer | ................. | F04D 29/628 4/541.1 |
| 7,762,559 B2 * | 7/2010 | Suzuki | ................... | F16J 15/104 277/627 |
| 7,828,302 B2 * | 11/2010 | Hurlbert | ................ | F16J 15/125 277/637 |
| 7,854,434 B2 * | 12/2010 | Heiman | ................. | F16J 15/121 277/628 |
| 7,905,498 B2 * | 3/2011 | Dempsey | .............. | F16J 15/104 277/649 |
| 7,972,123 B2 * | 7/2011 | Koide | .................... | F04B 27/0873 417/411 |
| 2002/0041812 A1 * | 4/2002 | Yokomachi | ......... | F04B 27/1036 417/269 |
| 2003/0143090 A1 | 7/2003 | Iritani et al. | | |
| 2004/0009078 A1 * | 1/2004 | Kimura | .................. | F04B 35/04 417/410.5 |
| 2004/0013543 A1 * | 1/2004 | Kimura | .................. | F04B 35/04 417/410.5 |
| 2004/0027105 A1 * | 2/2004 | Nakamura | ............ | H02M 3/158 323/267 |
| 2004/0052660 A1 * | 3/2004 | Kimura | .................. | F01C 21/10 417/410.3 |

(56) References Cited

U.S. PATENT DOCUMENTS

| | | | |
|---|---|---|---|
| 2004/0226761 A1* | 11/2004 | Takenaka | B60K 6/365 180/65.1 |
| 2005/0063836 A1* | 3/2005 | Kimura | F04B 39/121 417/313 |
| 2008/0111321 A1* | 5/2008 | Okumura | F16J 15/104 277/651 |

FOREIGN PATENT DOCUMENTS

| | | |
|---|---|---|
| JP | 06-201048 A | 7/1944 |
| JP | 54-49581 | 4/1979 |
| JP | 55-170446 | 12/1980 |
| JP | 61-173645 | 8/1986 |
| JP | 2-108875 | 4/1990 |
| JP | 2-115580 | 4/1990 |
| JP | 02-151237 A | 6/1990 |
| JP | 4-6578 | 1/1992 |
| JP | 04-58672 U | 5/1992 |
| JP | 2000-145971 A | 5/2000 |
| JP | 2000-283294 | 10/2000 |
| JP | 2002-005019 | 1/2002 |
| JP | 2002-115654 | 4/2002 |
| JP | 2002-339867 | 11/2002 |
| JP | 2002-364536 | 12/2002 |
| JP | 2004-044534 | 2/2004 |
| JP | 2004-052817 A | 2/2004 |
| JP | 2004-319640 A | 11/2004 |
| JP | 2004-343845 | 12/2004 |
| JP | 2004-353588 A | 12/2004 |

OTHER PUBLICATIONS

Supplementary European Search Report dated Jun. 13 2013 corresponding to European Application No. 07713705.7 and PCT/JP2007051173.

Office Action dated Aug. 13, 2013 in corresponding Japanese Patent Application No. 2007-014411.

Office Action dated Jan. 21, 2014 in corresponding Japanese Patent Application No. 2007-014411.

Japanese Office Action dated Jun. 19, 2012 in corresponding Japanese Patent Application No. 2007-014411.

Japanese Office Action for Application No. 2007-014411, dated Oct. 11, 2011.

English translation of the International Preliminary Report on Patentability dated Aug. 7, 2008, Application No. PCT/JP2007/051173.

* cited by examiner

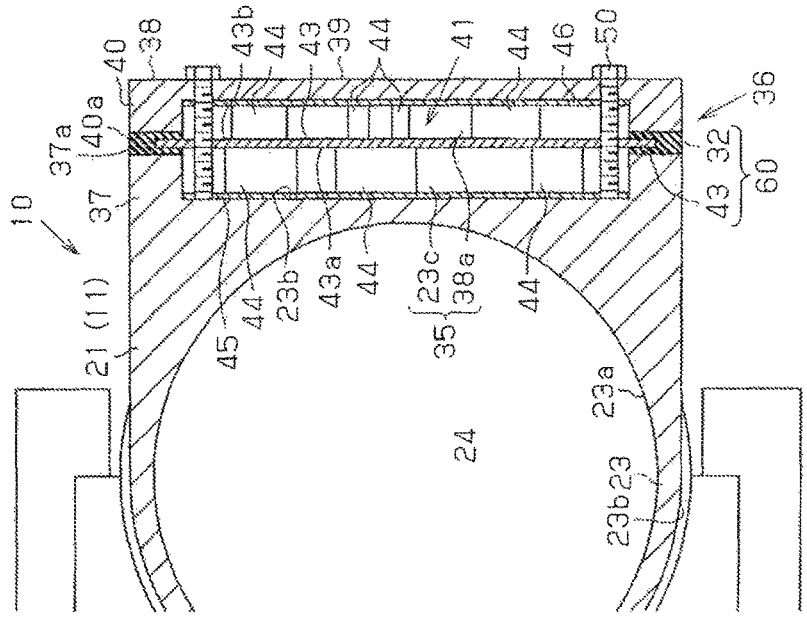
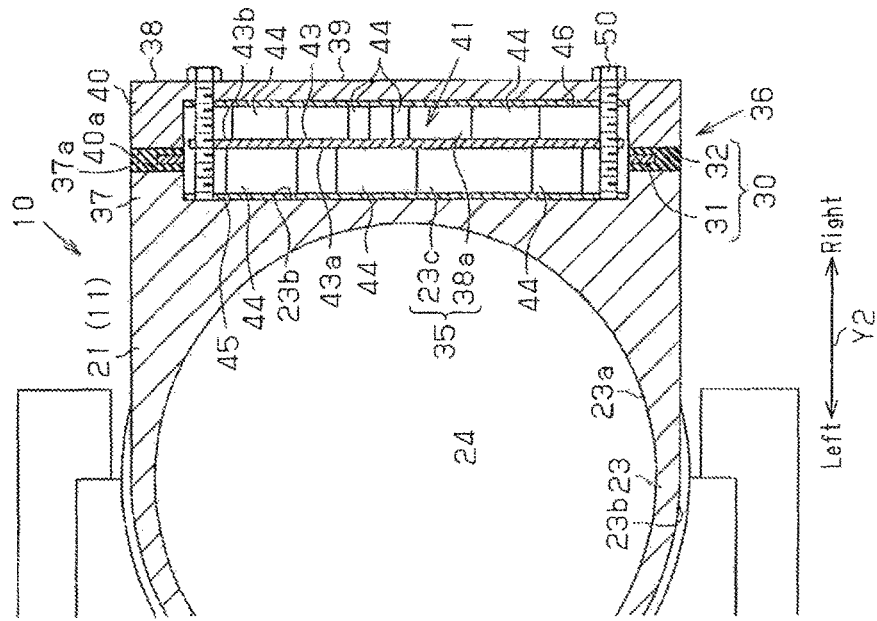

ELECTRICALLY-DRIVEN COMPRESSOR

This application is a divisional of U.S. patent application Ser. No. 14/703,130 filed May 4, 2015, which is a divisional of U.S. patent application Ser. No. 11/885,776 filed Aug. 7, 2008.

TECHNICAL FIELD

The present invention relates to an electrically-driven compressor including a compression mechanism driven by an electric motor, and more particularly, to an electrically-driven compressor in which a drive circuit for driving an electric motor is accommodated in an accommodation portion of a housing.

BACKGROUND ART

This type of electrically-driven compressor is disclosed in, for example, patent document 1. In the electrically-driven compressor disclosed in patent document 1, a scroll type compression mechanism and a motor (electric motor) for driving the compression mechanism are accommodated in a casing (housing) that forms the outer shell of the electrically-driven compressor. The motor, which is operated by the control an inverter controller, drives the compression mechanism. A tubular wall having a tubular shape projects from the upper part of the casing, and a cover member is fastened by bolts to an open end of the tubular wall with a circuit board of the inverter controller (motor drive circuit) located therebetween.

The cover member is attached so as to cover the inverter controller and protect the inverter controller from dust and moisture. A seal member (sealing member) is arranged at the open end of the tubular wall. The pressure condition in the casing is ensured by arranging the seal member (sealing member) between the tubular wall and the circuit board. A seal member is further arranged at an open end of the cover member. Dust and moisture are prevented from entering the cover member by arranging the seal member between the cover member and the circuit board.

In patent document 1, a rubber O-ring is used as the seal member. The seal member must be arranged along the entire circumference of the open end of the tubular wall and be in close contact with the open end of the tubular wall and the circuit board in order to ensure the pressure condition in the casing. The additional seal member must be arranged along the entire circumference of the open end of the cover member and be in close contact with the open end of the cover member and the circuit board to prevent dust and moisture from entering the cover member. In order to arrange each seal member along the entire circumference the corresponding open end, the shape of the seal member must be sustained to conform to the shape of the corresponding open end. Thus, a groove for sustaining the shape of the seal member must be formed at each open end in patent document 1.

A gasket may be used as the seal member. Since a gasket formed from a metal plate, a means for sustaining the shape of the seal member is not required. When the gasket is employed in the electrically-driven patent document 1, a gasket is held in close contact with the open end of the tubular wall and the circuit board to ensure the pressure conditions in the casing. An additional gasket is held in close contact with the open end of the cover member and the circuit board to prevent dust and moisture from entering the cover member.

The inverter controller employs a structure in which electrical components connected to the circuit board come into contact with the cover member so as to radiate heat from the electrical components through the cover member. This improves the heat radiation of the heat generated by the electrical components. However, when the electrical components contact the cover member, a gap is formed between the open end of the cover member and the circuit board. A gasket has the shape of a thin plate. Thus, when a gasket is used, the cover member must be accurately manufactured to equalize the gap between the open end of the cover member and the circuit board with the thickness of the gasket in order to close the gap so that the cover member comes into close contact with the gasket. If the cover member is manufactured with low accuracy, the adhesion of the open end of the cover member to the gasket decreases, and dust and moisture enters the cover member from the space between the cover member and the circuit board.

[Patent Document 1] Japanese Laid-Open Patent Publication No. 2002-364536

DISCLOSURE OF THE INVENTION

It is an object of the present invention to provide an electrically-driven compressor that does not require a means for sustaining the shape of a seal in the housing and the cover member while easily ensuring adhesion between the housing and the cover member.

To achieve the above objective, one aspect of the present invention is an electrically-driven compressor including a housing, an electric motor accommodated the housing, a compression mechanism accommodated in the housing and operated by the electric motor, and a cover member attached to the housing. The housing and the cover member form an accommodation portion including an accommodation space therein. A motor drive circuit is accommodated in the accommodation space for driving the electric motor. A sealing member arranged between the housing and the cover member seals the accommodation space. The sealing member includes an elastic seal portion that closely contacts the housing and the cover member and a shape sustaining member for sustaining the shape of the seal portion in conformance with a circumferential edge of the accommodation space. The shape sustaining member is shaped so that at least a circumferential edge part of the shape sustaining member is in conformance with the circumferential edge of the accommodation space. The seal portion is formed integrally with the circumferential edge part of the shape sustaining member by depositing rubber material thereon.

BRIEF DESCRIPTION OF THE DRAWINGS

FIG. 3 is a cross-sectional view taken along line 3-3 of FIG. 2 showing a state in which an electric motor is removed;

FIG. 4 is a cross-sectional view showing an accommodation portion of a second embodiment;

BEST MODE FOR CARRYING OUT THE INVENTION

A first embodiment of the present invention will now be described with reference to FIGS. 1 to 3. In the following description, the "front" and "rear" of the compressor correspond to the directions of the arrow Y1 shown in FIG. 1, and the "left" and "right" correspond to the directions of the arrow Y2 shown in FIG. 3.

Figure 1:
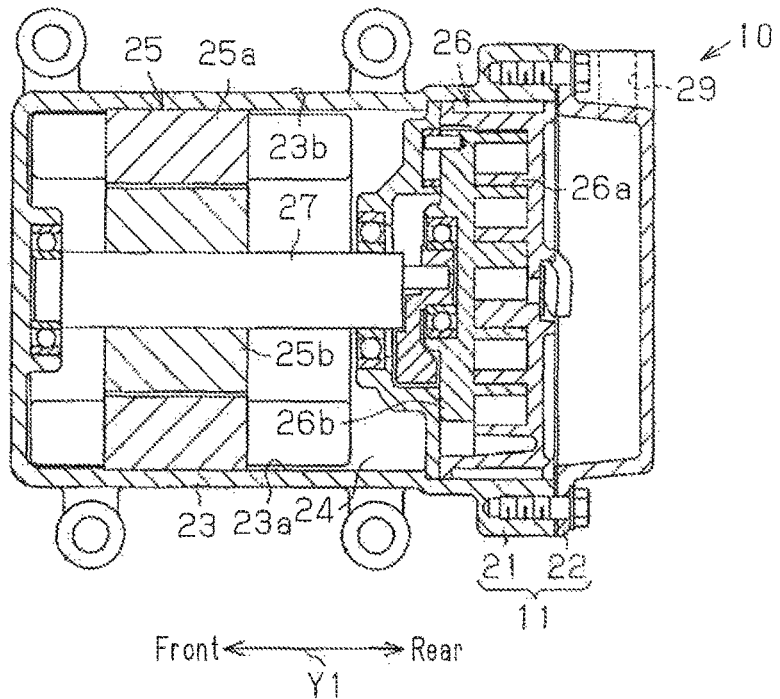
FIG. 1 is a longitudinal cross-sectional view showing an electrically-driven compressor according to a first embodiment.

As shown in FIG. 1, a housing 11 forming the outer shell of an electrically-driven compressor 10 includes a first housing element 21 and a second housing 22.

The second housing element 22 is joined and fixed to the rear end of the first housing element 21. The first housing element 21, which is formed by die casting aluminum alloy, has a bottom located at the front end of a substantially cylindrical circumferential wall 23. The second housing element 22, which is formed by die casting aluminum alloy, is cylindrical and has a lid located at the rear end. A sealed space 24 is formed between the first housing element 21 and the second housing element 22.

The first housing element 21 rotatable supports a rotation shaft 27. An electric motor 25 and a compression mechanism 26 are accommodated in the sealed space 24. The electric motor 25 includes a stator 25a fixed to an inner surface 23a of the circumferential wall 23 and a rotor 25b arranged on the rotation shaft 27 at the radially inward side of the stator 25a. The electric motor 25 rotates the rotation shaft 27 when power is supplied to the stator 25a.

The compression mechanism 26 is of a scroll type including a fixed scroll 26a and a movable scroll 26b. The compression mechanism 26 compresses refrigerant gas when the movable scroll 26b orbits relative to the fixed scroll 26a as the rotation shaft 27 rotates. When the electric motor 25 is driven to operate the compression mechanism 26, refrigerant gas is drawn from an external refrigerant circuit (not shown into the compression mechanism 26 through an intake port 28 (see FIG. 2) formed in the first housing element 21 through the electric motor 25. The refrigerant gas drawn into the compression mechanism 26 becomes high temperature and high pressure refrigerant gas due to the compression action of the compression mechanism 26. Then, the refrigerant gas is discharged out of a discharge port 29 formed in the second housing element 22 into the external refrigerant circuit.

Figure 2:
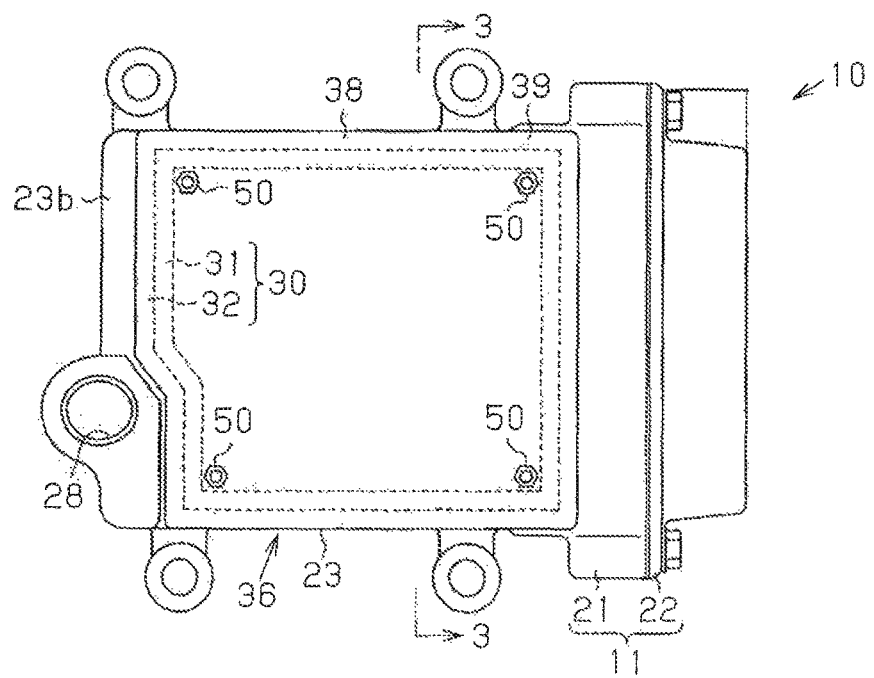
FIG. 2 is a side view showing the electrically-driven compressor of FIG. 1.

As shown in FIGS. 2 and 3, an accommodation portion 36 including an accommodation space 35 therein is formed in part of an outer surface 23b of the circumferential wall 23.

The accommodation portion 36 includes a side wall 37, which has the shape of a four-sided frame and extends integrally from the outer surface 23b of the circumferential wall 23, and a cover member 38, which is attached to an open end 37a of the side wall 37. An accommodation cavity 23c having a bottom defined by the outer surface 23b of the circumferential wall 23 is formed at the inner side of the side wall 37. The cover member 38 is formed from aluminum alloy or the like and has the shape of a square box with a lid at the right end. That is, the cover member 38 includes a tot plate portion 39 having the shape of a four-sided plate and a circumferential wall portion 40 projecting along the circumferential part of the top plate portion 39. An accommodation cavity 38a is formed at the inner side of the top plate portion 39 and the circumferential wall portion 40.

The cover member 38 is attached and fixed to the first housing element 21 with an open end 40a of the circumferential wall portion 40 facing an open end 37a of the side wall 37. The cover member 38 is attached to the first housing element 21 by fastening bolts 50, which are inserted through the cover member 38, with the first housing element 21. In this attached state, the accommodation space 35 is defined in the accommodation portion 36 by the accommodation cavity 23c and the accommodation cavity 38a. That is, the accommodation space 35 is formed by the outer surface 23b of the circumferential wall 23, the inner surface of the side wall 37, the inner surface of the circumferential wall portion 40, and the top surface of the top plate portion 39, as shown in FIG. 3. A sealing member 30 for sealing the accommodation space 35 is arranged between the open end 37a of the side wall 37 and the open end 40a of the circumferential wall portion 40, or along the circumferential edge of the accommodation space 35.

A motor drive circuit 41 for driving the electric motor 25 is accommodated in the accommodation space 35. The motor drive circuit 41, which includes an inverter, supplies power to the stator 25a of the electric motor 25 based on an external command from an air conditioner ECU (not shown). The motor drive circuit 41 includes a planar circuit board 43 and plural types of electrical components 44. The electrical components 44 are respectively connected to the circuit board 43 on a surface 43a facing the first housing element 21 and a surface 43b facing the cover member 38.

The circuit board 43 is fixed to the circumferential wall of the first housing element 21 by the bolts 50. The electrical components 44 include known components forming the inverter (i.e., switching element, electrolytic capacitor, transformer, driver, fixed resistor, etc.). The electrical components 44 arranged on the surface 43a of the circuit board contact the first housing element 21 by way of an insulating plate 45, and the electrical components 44 arranged on the surface 43b of the circuit board 43 contact the top plate portion 39 of the cover member 38 by way of an insulating plate 46. The insulating plates 45 and 46 are preferably formed from materials having superior heat conductivity.

The sealing member 30 will now be described in detail. As shown in FIGS. 2 and 3, the sealing member 30 has the shape of a generally four-sided frame and includes a core 31 and a seal portion 32. The core 31 serves as a shape sustaining member having the shape of a generally four-sided frame. The core 31 is mace of, for example, stainless steel, and has the required rigidity. Therefore, the core 31 sustains its shape with its rigidity and is not easily deformed by external force or the like. The seal portion 32 is made of a rubber material (e.g., hydrogenated nitrile rubber (HNBR), oil bearing rubber, etc.) integrated with the core 31. Materials having superior elasticity are suitable for use as the rubber material. The sealing member 30 has an outline formed by the seal portion 32, and the core 31 is embedded in the inner side of the seal portion 32. That is, the seal portion 32 is integrated with the core 31 so as to include the outer circumferential part of the core 31.

The sealing member 30 has a shape that conforms to the circumferential edge of the accommodation space 35, that is, the shape of a generally four-sided frame conforming to the open end 37*a* of the side wall 37 and the open end 40*a* of the circumferential wall portion 40. The core 31 and the seal portion 32 also have the shape of a generally four-sided frame so as to conform to the shape of the two open ends 37*a* and 40*a*. The width of each side of the four-sided frame forming the seal portion 32 is the same as the width of the corresponding side of the side wall 37 and the width of the side of the circumferential wall portion 40. Thus, in state in which the sealing member 30 is arranged between the open ends 37*a* and 40*a*, the inner circumferential edge of the seal portion 32, the inner circumferential edge of the side wall 37, and the inner circumferential edge of the circumferential wall portion 40 lie along the same plane, and the outer circumferential edge of the seal portion 32, the outer circumferential edge of the side wall 37, and the outer circumferential edge of the circumferential wall portion 40 lie along the same plane.

The sealing member 30 is manufactured in the following manner. To manufacture the sealing member 30, the core 31 is first shaped into a generally four-sided frame that conforms to the open end 37*a* of the side wall 37 and the open end 40*a* of the circumferential wall portion 40. Rubber material is then vapor-deposited on the core 31, which has been shaped as a generally four-sided frame. This integrates the seal portion 32 with the core 31 and manufactures the sealing member 30.

To form the accommodation portion 36 with the sealing member 30, the cover member 38 is first arranged so that the open end 40*a* faces the open end 37*a*. Then, the sealing member 30 is arranged between the two open ends 37*a* and 40*a*. That is, the seal portion 32 of the sealing member 30 is arranged on the circumferential edge of the accommodation space 35. The cover member 38 is then secured to the first housing element 21 with the bolts 50, the sealing member 30 is held between the open ends 37*a* and 40*a*, and the seal portion 32 comes into close contact with the open ends 37*a* and 40*a*. During the attachment of the cover member 38, the sealing member 30 is shaped into a generally four-sided frame that conforms to the two open ends 37*a* and 40*a*, and the shape of the seal portion 32 is sustained to the generally four-sided frame shape by the core 31. Thus, a positioning means for shaping the sealing member 30, in particular, the seal portion 32, in conformance with the two open ends 37*a* and 40*a* is not necessary.

When attaching the cover member 38, the seal portion is elastically deformed by the axial fastening force of the bolts 50. The top plate portion 39 of the cover member 38 contacts the electrical components 44 by way of the insulating plate 46 when the cover member 38 is attached to the first housing element 21. In this state, the open end 40*a* is spaced from the open end 37*a*, and a gap is formed between the two open ends 37*a* and 40*a*. However, this gap is closed by the seal portion 32 arranged between the two open ends 37*a* and 40*a*, and the surfaces of the seal portion 32 respectively facing the open ends 37*a* and 40*a* come into close contact with the open ends 37*a* and 40*a*. The seal portion 32 ensures the adhesion between the open end 37*a* and the open end 40*a*. Furthermore, the seal portion 32 elastically deforms in its thicknesswise direction due to the axial fastening force of the bolts 50. The elastic deformation absorbs the dimensional tolerance of the two open ends 37*a* and 40*a*. This improves the adhesion of the side wall 37 and the cover member 38.

The above embodiment has the advantages described below.

(1) The sealing member 30 is arranged between the open end 37*a* and the open end 40*a* at the circumferential edge of the accommodation space 35. The seal portion 32 seals the accommodation space 35 close contact with the open ends 37*a* and 40*a*. The sealing member 30 includes the core 31, which has the shape of a generally four-sided frame and which is arranged along the circumferential direction of the open ends 37*a* and 40*a*, and the seal portion 32, which is formed by vapor-depositing rubber material on the core 31. Thus, the seal portion 32 of the sealing member 30 is sustained in a generally four-sided frame shape conforming to the open ends 37*a* and 40*a* by the core 31. A means for sustaining the shape of the seal portion 32 as a four-sided frame shape (e.g., groove and adhesive for holding the seal portion 32) thus does not need to be arranged on the open ends 37*a* and 40*a*. Consequently, the manufacturing of the electrically-driven compressor 10 is facilitated.

(2) The shape of the seal portion 32 is sustained by the core 31. Therefore, the sealing member 30 is attached to the accommodation portion 36 just by arranging the sealing member 30 on the circumferential edge of the accommodation space 35 and holding it between the open end 37*a* and the open end 40*a*. The formation of the accommodation portion 36, and furthermore, the assembly of the electrically-driven compressor 10 is facilitated compared to, for example, when an 0-ring is fitted to the groove. Furthermore, the seal portion 32 does not need to be joined to the open ends 37*a* and 40*a* with an adhesive or the like. Therefore, the cover member 38 and the sealing member 30 are easily disassembled when disassembling the accommodation portion 36.

(3) When the cover member 38 is attached to the housing 11, the electrical components 44 contact the cover member 38, and a gap is formed between the open end 37*a* of the housing 11 and the open end 40*a* of the cover member 38. If a gasket having the form of a thin plate is used as the sealing member, the gap between the housing 11 and the cover member 38 must correspond to the thickness of the gasket in the state of contact. However, in the present embodiment, the gap is closed as the seal portion 32 elastically deforms. Thus, the housing 11 (side wall 37) and the cover member 38 do not need to be accurately manufactured. Accordingly, the gap is closed increasing costs as would the result when accurately manufacturing the housing 11 and the cover member 38.

(4) The dimensional tolerance is absorbed by the 10 elastic deformation of the seal portion 32 even if the size of the gap slightly differs due to the dimensional tolerance allowed for the housing 11 (side wall 37) and the cover member 38. Therefore, the accommodation space 35 is sealed with the closing of the gap ensured by the seal portion 32.

(5) Since the open end 37*a* and the open end 40*a* have the shape of a generally four-sided frame, the seal portion 32 also needs to be sustained in the generally four-sided frame shape. In this regard, a means (e.g., groove) for sustaining the seal portion 32 in a generally four-sided frame shape does not need to be arranged in the open ends 37*a* and 40*a* since the shape of the seal portion 32 is sustained by the core 31 in the present embodiment. When using an 0-ring as the sealing member, it is difficult to sustain the 0-ring, which has a circular shape, in a generally four-sided frame shape. Further, a shape sustaining means such as groove must always be formed on the open ends 37a and 40a. Accordingly, the structure for sustaining the seal portion 32 in a generally four-sided frame shape with the core 31 is particularly effective when the sealing regions have a polygonal (four-sided) frame shape.

(6) Rubber material is vapor-deposited on the core 31, which is shaped as a generally four-sided frame in advance to integrate the core 31 with the seal portion 32 and manufacture the sealing member 30. Therefore, unnecessary material is not produced, whereas unnecessary material would be produced when manufacturing a gasket by depositing rubber material on a metal plate to form a rubber thin film and then punching the metal plate to a desired shape (generally four-sided frame shape in the present embodiment).

(7) The sealing member 30 has rubber material deposited after the core 31 is shaped into a generally four-sided frame. Therefore, the shaping of the core 31 into a generally four-sided frame is easily performed, and the manufacturing of the sealing member 30 is facilitated.

A second embodiment of the present invention will now be described with reference to FIG. 4. In the second embodiment described below, the same reference numerals are used for components that are the same as the first embodiment, and the redundant description of such components will either be omitted or simplified.

As shown in FIG. 4, a sealing member 60 of the second embodiment is formed with the seal portion 32 integrated with a circumferential edge part of a circuit board 43, which has the shape of a four-side plate, in the motor drive circuit 41. That is, the circumferential edge part of the circuit board 43 is also used as the shape sustaining member for sustaining the seal portion 32 in the shape conforming to the open ends 37a and 40a.

Accordingly, the present embodiment has the following advantage in addition to the advantages similar to advantages (1) to (5) of the first embodiment.

(8) The sealing member 60 is formed by integrating the seal portion 32 with the circuit board 43 of the motor drive circuit 41. Thus, the seal portion 32 may be arranged at the circumferential edge of the accommodation space 35 at the same time when arranging the motor drive circuit 41 in the accommodation space 35. Thus, in the present embodiment, the task for forming the accommodation portion 36 can be eliminated as compared to when the task for arranging the motor drive circuit 41 in the accommodation space 35 and the task for arranging the sealing member 30 are separately performed during the formation of the accommodation portion 36. This facilitates the manufacturing of the electrically-driven compressor 10.

A third embodiment of the present invention will now be described with reference to FIGS. 5 and 6. In the third embodiment described below, the same reference numerals are used for components that are the same as the first embodiment, and the redundant description of such components will either be omitted or simplified.

Figure 5:
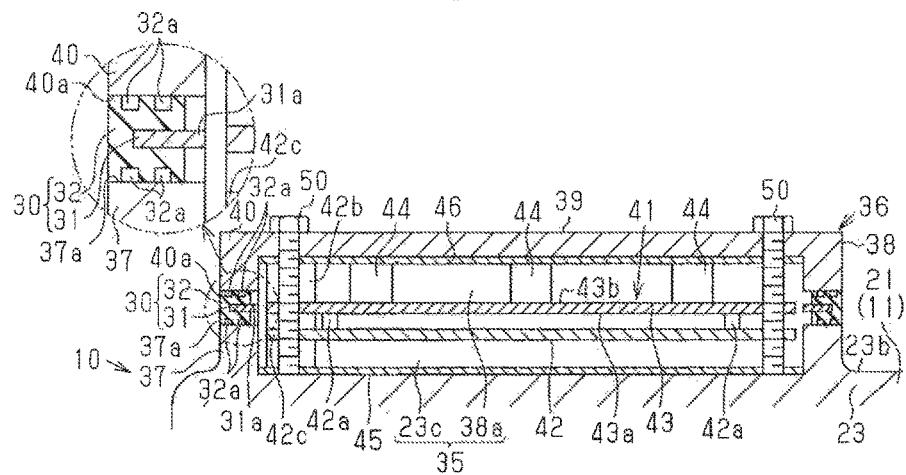
FIG. 5 is a partial cross-sectional view showing an accommodation portion of a third embodiment.

As shown in FIG. 5, the accommodation portion 36 is arranged on the upper part of the circumferential wall 23 of the first housing element 21 in the third embodiment. That is, the accommodation portion 36 includes the side wall 37 of four-sided frame shape integrally extended from the outer surface 23b (upper surface in FIG. 5) of the circumferential wall 23, and a cover member 38 attached and fixed to the side wall 37. The sealing member 30 is arranged between the open end 37a of the side wall 37 in the housing 11 and the open end 40a of the circumferential wall portion 40.

Figure 6:
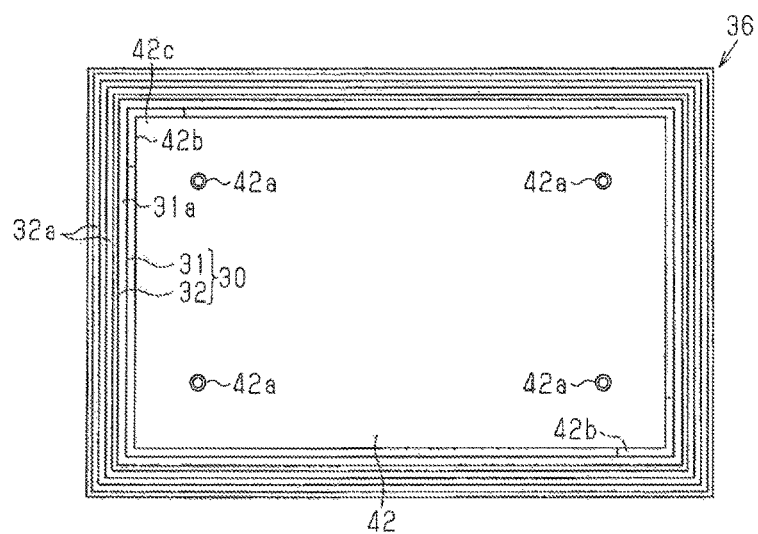
FIG. 6 is a plan view showing the interior of an accommodation space.

As shown in FIG. 6, the sealing member 30 is formed to have a four-sided frame shape and arranged along the circumferential edge of the accommodation space 35. The sealing member 30 includes core 31, which serves as a shape sustaining member having the shape of a generally four-sided frame, and a seal portion 32, which is made of a rubber material integrated with the core 31. The sealing member 30 has an outline formed by the seal portion 32, and the core 31 is embedded in the inner side of the seal portion 32. An inner circumferential part 31a of the core 31 extends from the inner circumference of the seal portion 32 towards the inner side of the sealing member 30. In FIG. 5, a groove portion 32a is arranged on both upper and lower surfaces (outer surfaces) of the seal portion 32, and the groove portions 32a are arranged at positions located at the inner sides of the inner circumferential edge and the outer circumferential edge of the seal portion 32. The groove portions 32a extend across the entire seal portions 3 in the circumferential direction.

As shown in FIG. 5, the motor drive circuit 41 accommodated in the accommodation space 35 includes a base 42, which is made of aluminum, and the circuit board 43, which is fixed to the base 42. The circuit board 43 is arranged on the upper side of the base 42. The base 42 is formed to have the shape of four-sided plate. A support portion 42a is arranged on the upper surface of the base 42. The circuit board 43 is fixed to the base 42 by inserting a screw (not shown) through the circuit board 43 and fastening the screw to a screw attachment hole (not shown) of the support portion 42a. FIG. 6 is a plan view showing the interior of the accommodation portion 36. In FIG. 6, the cover member 38 and the circuit board 43 are rot shown, and only the base 42 is shown. As shown in FIG. 6, among the four corners of the base 42, a contact portion 42b forming a positioning portion is defined by two sides forming each of two opposing diagonal corners. That is, the contact portion 42b is arranged on the outer circumferential part 42c of the base 42 and is extended to the upper side and the lower side of the base 42. The outer surface of each contact portion 10 42b has a planar shape.

When forming the accommodation portion 36 with the sealing member 30, the motor drive circuit 41 is first accommodated on the inner side of the cover member 38. Then, the cover member 38 and the motor drive circuit 41 are integrated with each other by bolts (not shown). The outer surface of the contact portion 42b contacts the inner circumferential surface of the circumferential wall portion 40 in a state in which the motor drive circuit 41 is integrated with the cover member 38. Furthermore, the sealing member 30 is arranged on the open end 37a, and the cover member 38 is arranged on the sealing member 30. The cover member 38 is attached to the first housing element 21 with the bolts 50 inserted through the cover member 38 and the motor drive circuit 41 (circuit board 43 and base 42). The sealing member 30 is held between the open ends 37a and 40a so that the seal portion 32 of the sealing member 30 closely contacts each of the open ends 37a and 40a.

In the accommodation portion 36, the motor drive circuit 41 is prevented from moving in the lateral direction or the rotation direction in the accommodation space 35 since the motor drive circuit 41 is fastened to the cover member 38 with bolts. The outer surfaces of the two contact portions 42b of the base 42 contact the inner circumferential part 31a of the core 31 facing the contact portions 42b. That is, the two sides forming each of two opposing diagonal corners and the contact portions 42b of the base 42 facing such two sides at the inner circumferential part 31a of the core 31 are in contact at the inner circumferential part 31a of the core 31. Since the motor drive circuit 41 is positioned by fastening the cover member 38 with the bolts, the sealing member 30 contacting the contact portion 42b of the base 42 is also prevented from moving in the lateral direction or the rotation direction. The groove portion 32a of the seal portion 32 is arranged at a position facing the open end 37a of the side wall 37 and the open end 40a of the circumferential wall portion 40 by positioning the sealing member 30.

Therefore, in the present embodiment, the inner circumferential part 31a of the core 31 in the sealing member 30 and the contact portion 42b of the base 42 in the motor drive circuit 41 form the positioning portion for positioning the sealing member 30 between the side wall 37 (housing) and the cover member 38.

The present embodiment has the following advantages in addition to the advantages similar to advantages (1) to (7) of the first embodiment.

(9) The inner circumferential part 31a of the core 31 is projected from the inner circumferential surface of the seal portion 32, and the contact portion 42b of the motor drive circuit 41 (outer circumferential part 42c of the base 42) positioned in the accommodation space 35 comes into contact with the inner circumferential part 31a. This positions the sealing member 30 between the open ends 37a and 40a, and the sealing member 30 is prevented from being displaced by vibrations or the like during the operation of the electrically-driven compressor 10. The groove portions 32a are thus maintained in a state facing the open ends 37a and 40a. Consequently, foreign material, moisture, and the like are collected in the groove portions 32a even when entering the space between each open end 37a and 40a and the seal portion 32. Accordingly, the period required for foreign material, moisture, and the like to reach the accommodation space 35 is extended compared to when there are no groove portions 32a.

(10) The inner circumferential part 31a of the core 31, which is made of metal, comes into contact with the contact portion 42b, which is made of metal. Thus, deficiencies such as the sealing member 30 being displaced due to the 20 elastic deformation of the seal portion 32 does not occur like when, for example, the seal portion 32 of the sealing member 30 comes into contact with the contact portion 42b. This ensures prevention of displacement of the sealing member 30.

(11) The positioning of the sealing member 30 is performed using the contact portion 42b formed on the motor drive circuit 41. The sealing member 30 is positioned with a simple structure of extending the contact portion 42b to the base 42 of the motor drive circuit 41. Therefore, the number of components is reduced compared to when extending a pin hole formation portion, which includes a pin hole, on the inner circumferential side of the sealing member 30, forming a pin hole in the first housing element 21, and positioning the sealing member 30 by press-fitting the pin into the pin hole. In addition, the cost for forming the pin hole formation portion and the pin hole, the cost of the pins, and the cost required for press-fitting the pins are reduced. The cost required for forming the accommodation portion 36, and furthermore, the cost required for manufacturing the electrically-driven compressor 10 is thus reduced.

(12) The contact portion 42b is formed along the two sides forming each of two corners in the outer circumferential part 42c of the base 42. The two opposing corners at the inner circumferential part 31a of the core 31 contact the contact portions 42b at the sealing member 30. Thus, rotation and movement of the sealing member 30 is prevented without arranging the contact portion 42b across the entire circumference of the base 42.

(13) The outer surface of the contact portion 42b is formed have a planar shape. The sealing member 30 is positioned by contact between the contact portion 42b, which has a planar shape, and the inner circumferential part 31a of the core 31. This facilitates the positioning task of the sealing member 30.

The present embodiment may be modified as described below.

In the third embodiment, the contact portion 42b may project from the entire circumference of the outer circumferential part 42c of the base 42. In this case, the entire circumference of the inner circumferential part 31a of the core 31 contacts the contact portion 42b. This positions the sealing member 30.

Figure 7:
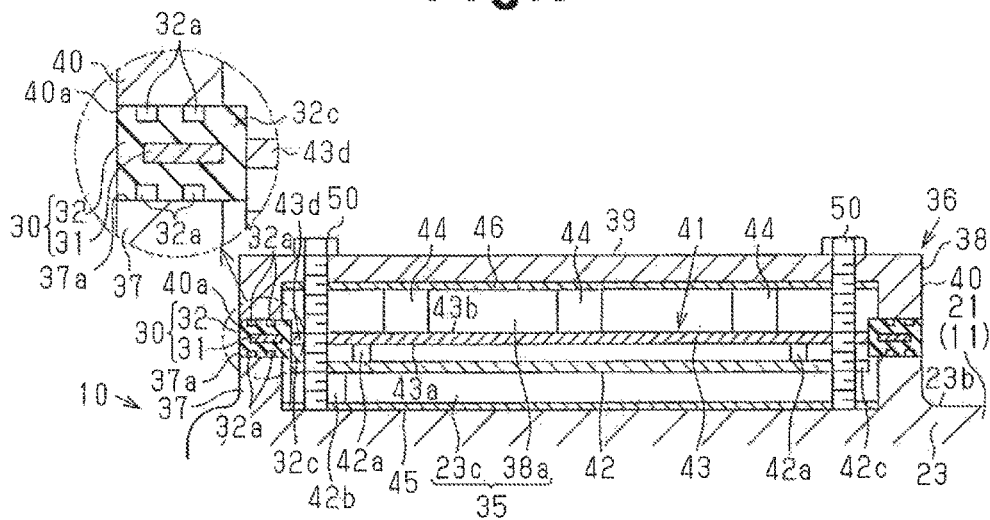
FIG. 7 is a partial cross-sectional view showing another example of the third embodiment.

The third embodiment may be modified as described below. As shown in FIG. 7, the core 31 is entirely covered by the seal portion 32. In a state in which the sealing member 30 is arranged between the open ends 37a and 40a, the inner circumferential part 32c of the seal portion 32 is formed so as to project towards the accommodation space 35 from the inner circumferential edges of the side wall 37 and the circumferential wall portion 40. The motor drive circuit 41 is positioned in the accommodation space 35 at the same time as when the cover member 38 is fixed to the first housing element 21 with the bolts 50. This prevents movement in the accommodation space 35. The sealing member 30 is positioned by contact of the inner circumferential part 32c of the seal portion 32 with the outer circumferential part 43d of the circuit board 43 positioned in the accommodation space 35. In this case, the entire circumference of the inner circumferential part 32c of the seal portion 32 contacts the entire circumference of the outer circumferential part 43d of the circuit board 43. However, among the four corners of the inner circumferential part 32c, the two opposing corners may contact the outer circumferential part 43d of the circuit board 43 at positions facing the two corners. The positioning portion is formed by the inner circumferential part 32c of the seal portion 32 and the outer circumferential part 43d (contact portion) of the circuit board 43.

In the third embodiment, in a state in which the sealing member 30 is arranged between the open ends 37a and 40a, the inner circumferential part 31a of the core 31 is formed so as to project towards the accommodation space 35 from the inner circumferential edge of the side wall 37 and the circumferential wall portion 40. The motor drive circuit 41 is positioned in the accommodation space 35 at the same time as when the cover member 38 is fixed to the first housing element 21 with the bolt 50. This prevents movement in the accommodation space 35. The sealing member 30 is positioned by contact of the inner circumferential part 31a of the core 31 with the outer circumferential part 43d of the circuit board 43 positioned in the accommodation space 35. In this case, the entire circumference of the inner circumferential part 31a of the core 31 contacts the entire circumference of the outer circumferential part 43d of the circuit board 43. However, among the four corners of the inner circumferential part 31a, the two opposing corners may contact the outer circumferential part 43d of the circuit board 43 at positions facing the two corners. The positioning portion is formed by the inner circumferential part 31a of the core 31 and the outer circumferential part 43d (contact portion) of the circuit board 43.

Figure 8:
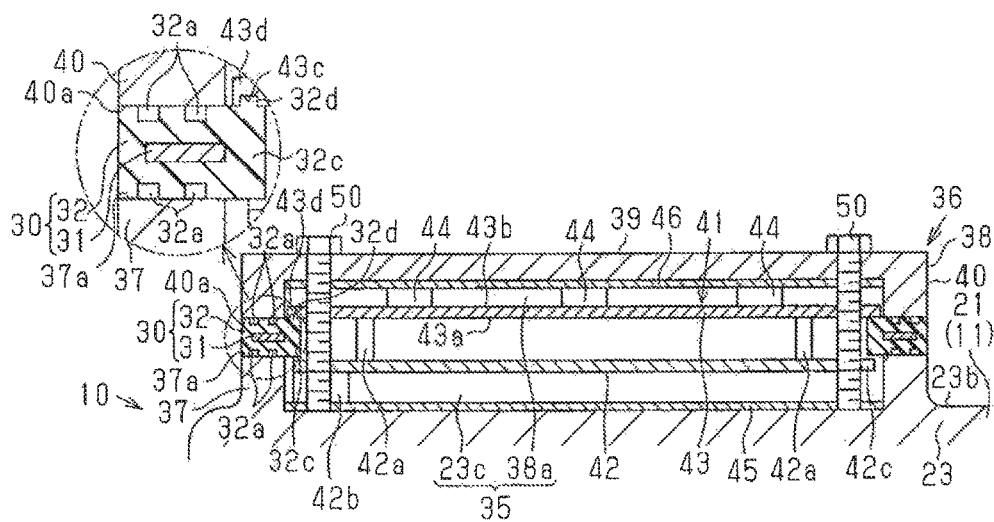
FIG. 8 is a partial cross-sectional view showing a sealing member of another example of the third embodiment.

The third embodiment may be modified as described below. As shown in FIG. 8, the sealing member 30 may be formed such that the core 31 is entirely covered by the seal portion 32. In a state in which the sealing member 30 is arranged between the open ends 37a and 40a, the inner circumferential part 32c of the seal portion 32 is formed so as to project towards the accommodation space 35 from the inner circumferential edges of the side wall 37 and the circumferential wall portion 40. The motor drive circuit 41 is positioned in the accommodation space 35 at the same time as when the cover member 38 is fastened to the first housing element 21 with the bolts 50. This prevents the motor drive circuit 41 from moving in the accommodation space 35.

Furthermore, among the four corners of the inner circumferential part 32c, a projection 32d is formed on each of two opposing corners. Each projection 32d extends across the upper surface of the two sides forming the corresponding corner. Recesses 43c engageable with the projections 32d are formed on the lower surface of the outer circumferential part 43d of the circuit board 43. The sealing member 30 is positioned by the engagement of the projections 32d with the recesses 43c. In this case, the positioning portion is formed by the projections 32d and the recesses 43c. A projection 32d may be formed to extend along the entire circumference of the upper surface of the seal portion 32, and a recess 43c may be formed to extend along the entire circumference of the lower surface of the circuit board 43. Such a structure prevents movement of the sealing member 30 by the contact between the outer surface of the projection 32d and the inner surface of the recess 43c.

Instead of forming the projection 32d on the seal portion 32, the inner circumferential part 31a of the core 31 may be projected towards the inner side of the sealing member 30 from the inner circumference of the seal portion 32, and a projection may be formed on the upper surface of the inner circumferential part 31a of the core 31. In this case, the recess engageable with the projection of the core 31 is formed on the lower surface of the outer circumferential part 43d of the circuit board 43. The projection of the core 31 and the recess of the circuit board 43 form the positioning portion.

Figure 9:
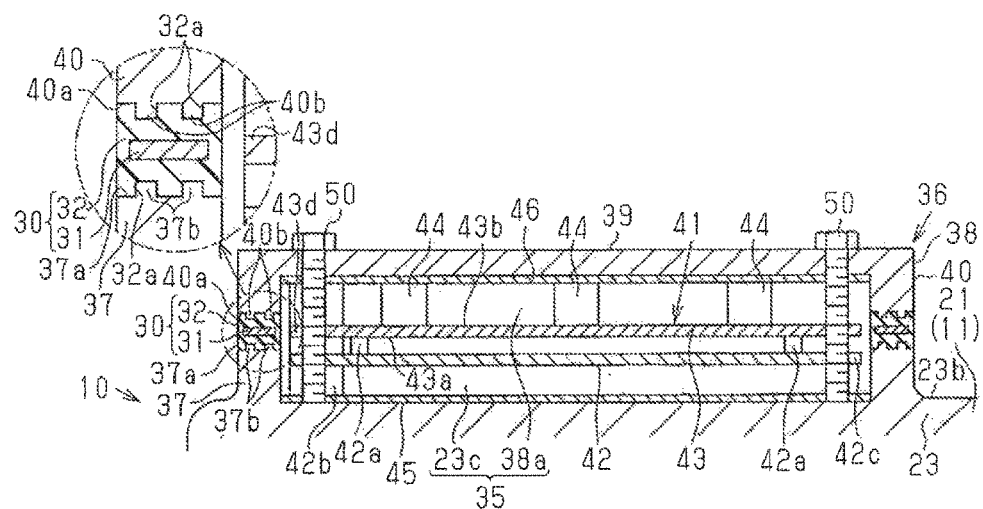
FIG. 9 is a partial cross-sectional view showing another example of the third embodiment.

The third embodiment may be modified as described below. As shown in FIG. 9, engagement projections 37b that engage the groove portions 32a of the seal portion 32 are formed on the open end 37a of the side wall 37, and engagement projections 40b that engage the groove portions 32a of the seal portion 32 are formed on the open end 40a of the circumferential wall portion 40. The sealing member 30 is positioned by the engagement of the groove portions 32a and the engagement projections 37b and 40b. With such a structure, the movement of the sealing member 30 is prevented by contact of the outer surfaces of the engagement projections 37b and 40b with the inner surface of the groove portion 32a. Thus, the groove portions 32a slow the infiltration of moisture or the like into the accommodation space 35. The sealing member 30 may thus be positioned using a structure provided in advance on the sealing member 30. Among the four corners of the open end 37a (40a), the engagement projection 37b (40b) may be arranged only on two diagonal opposing corners. In the third embodiment, the core 31 may be entirely covered by the seal portion 32, and the inner circumferential part 32c of the seal portion 32 may come into contact with the contact portion 42b of the base 42. In this case, the positioning portion is formed by the inner circumferential part 32c and the contact portion 42b that contact each other.

In the third embodiment, the core 31 is entirely covered by the seal portion 32, and the inner circumferential part 32c of the seal portion 32 may come into contact with the contact portion 42b of the base 42. Furthermore, the engagement projections 37b that engage the groove portions 32a of the seal portion 32 are formed on the open end 37a of the side wall 37, and the engagement projections 40b that engage the groove portions 32a of the seal portion 32 are formed on the open end 40a of the circumferential wall portion 40. The sealing member 30 may be positioned by the engagement of the groove portions 32a with the engagement projections 37b and 40b. That is, the sealing member 30 may be positioned by the contact portion 42b arranged on the motor drive circuit 41 and the engagement projections 37b and 40b arranged in the accommodation portion 36.

Figure 10:
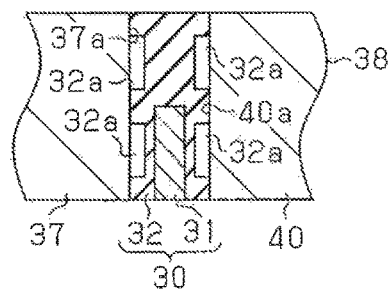
FIG. 10 is a partial cross-sectional view showing a sealing member of another example.

As shown in FIG. 10, for example, in the first embodiment, groove portions 32a extending across the entire circumferential direction of the sealing member 30 may be formed on the surface of the seal portion 32 facing the corresponding open ends 37a and 40a. In such a structure, foreign material, moisture, and the like can be collected in the groove portions 32a even when entered the space between each open end 37a and 40a and the seal portion 32. This prevents foreign material, moisture, and the like from reaching the accommodation space 35. Further, the groove portions 32a may not extend across the entire circumferential direction of the sealing member 30. The groove portions 32a may be formed on only one part of the sealing member 30 in the circumferential direction. Alternatively, a plurality of groove portions 32a may be arranged on the sealing member 30 at equal or random intervals in the circumferential direction.

Figure 11:
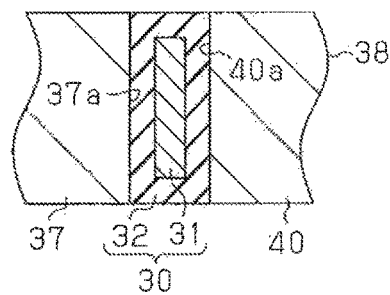
FIG. 11 is a partial cross-sectional view showing a sealing member of another example.

As shown in FIG. 11, the core 31 may be entirely covered by the seal portion 32 in the sealing member 30 of the first embodiment.

Figure 12:
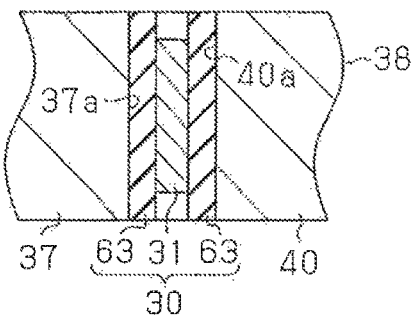
FIG. 12 is a partial cross-sectional view showing a sealing member of another example.

As shown in FIG. 12, rubber plates 63 made of a rubber material may be joined to the surfaces of the core 31 facing the corresponding open ends 37a and 40a in the sealing member 30 of the first embodiment so that each rubber plate 63 forms the seal portion.

Figure 13:
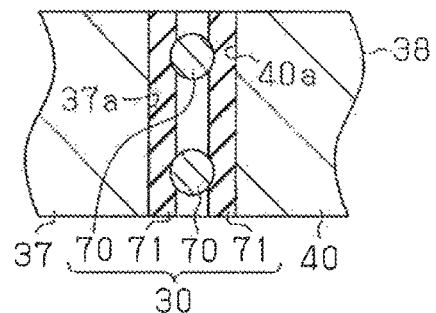
FIG. 13 is a partial cross-sectional view showing a sealing member of another example.

As shown in FIG. 13, the shape sustaining member may be formed by a pair of metal wires 70 forming a four-sided frame shape in the sealing member 30 of the first embodiment. Rubber plates 71 made of a rubber material may be joined to the sides of the wires 70 facing the corresponding open ends 37a and 40a.

Figure 14:
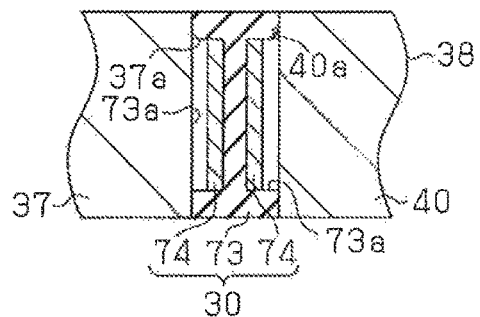
FIG. 14 is a partial cross-sectional view showing a sealing member of another example.

As shown in FIG. 14, the seal portion may be formed by a rubber plate 73 having a four-sided frame shape, and an accommodation cavity 73a may be formed in the surfaces of the rubber plate 73 facing the corresponding open ends 37a and 40a in the sealing member 30 of the first embodiment. A core 74 serving as the shape sustaining member may be accommodated in each accommodation cavity 73a.

Figure 15:
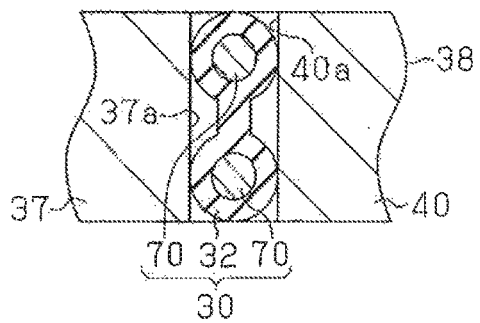
FIG. 15 is a partial cross-sectional view showing a sealing member of another example.

As shown in FIG. 15, the shape sustaining member may be formed by a pair of metal wires 70 forming a four-sided frame shape, and the wires 70 may be entirely coated with a rubber material and the seal portion 32 may be formed on the entire circumference of the wire 70 in the sealing member 30 of the first embodiment.

In the third embodiment, a contact strip may be extending upward from the inner circumferential surface of the side wall 37, and the inner circumferential part 31a of the core 31 of the sealing member 30 may come into contact with the contact strip in order to position the sealing member 30. Alternatively, the contact strip may be extended downward from the inner circumferential surface of the circumferential wall portion 40 of the cover member 38, and the inner circumferential part 31a of the core 31 of the sealing member 30 may come into contact with the contact strip in order to position the sealing member 30.

The compression mechanism 26 is not limited to the scroll type, and may be, for example, a piston type, a vane 10 type, a helical type, or the like.

The open end 37a of the side wall 37 and the open end 40a of the cover member 38 are not limited to the four-sided frame shape and may have any shape such as round frame shape, a three-sided frame shape, and the like. In this case, the shapes of the core 31 and the seal portion 32 are changed in accordance with the shapes of the open ends 37a and 40a.

The accommodation space 35 may be formed by only the accommodation cavity 38a of the cover member 38. In this case, the side wall 37 (accommodation cavity 23c) is omitted. Alternatively, the accommodation space 35 may be formed by only the accommodation cavity 23c of the side wall 37. In this case, circumferential wall portion 40 (accommodation cavity 38a) of the cover member 38 is omitted.

The invention claimed is:

1. An electrically-driven compressor comprising:
a housing;
an electric motor accommodated in the housing;
a compression mechanism accommodated in the housing and operated by the electric motor;
a cover member attached to the housing, wherein the housing and the cover member form an accommodation portion including an accommodation space therein;
a motor drive circuit, accommodated in the accommodation space, for driving the electric motor; and
a sealing member, arranged between the housing and the cover member, for sealing the accommodation space, wherein the sealing member includes an elastic seal portion that closely contacts the housing and the cover member and a shape sustaining member for sustaining the shape of the seal portion in conformance with a circumferential edge of the accommodation space, the shape sustaining member is shaped so that at least a circumferential edge part of the shape sustaining member is in conformance with the circumferential edge of the accommodation space, and the seal portion is formed integrally with the circumferential edge part of the shape sustaining member by depositing rubber material thereon, wherein
the shape sustaining member includes a core having the shape of a frame and extending along the circumferential edge of the accommodation space,
the sealing member has the shape of a frame extending along the circumferential edge of the accommodation space,
a positioning portion for positioning the sealing member between the housing and the cover member by contacting or engaging the sealing member is arranged between the sealing member and the motor drive circuit,
the cover member and the motor drive circuit are integrated with each other,
the motor drive circuit includes a base and a circuit board,
the cover member and the base are made of aluminum,
the circuit board is fixed to the base,
the positioning portion is arranged on an outer circumferential part of the base and is extended to an upper side and a lower side of the base, and
the sealing member is attached to the cover member with the sealing member being in contact with an open end of the cover member and the positioning portion.

2. The electrically-driven compressor according to claim 1, wherein:
the housing includes a side wall having the shape of a polygon and extending from the housing, the side wall having an open end; and
the accommodation portion is formed by attaching the cover member to the open end of the side wall so as to cover the open end of the side wall.

3. The electrically-driven compressor according to claim 2, wherein:
the core includes an inner circumferential part extending toward the accommodation space from an inner circumference of the seal portion; and
the sealing member is positioned by contact of the inner circumferential part of the core with a contact portion arranged on an outer circumferential part of the motor drive circuit.

4. The electrically-driven compressor according to claim 2, further comprising a groove portion arranged on the seal portion and an engagement projection arranged on at least one of the housing and the cover member and engageable with the groove portion.

5. The electrically-driven compressor according to claim 2, wherein:
the sealing member has the shape of a polygonal frame and includes a plurality of corners; and
the positioning portion is arranged between each of two opposing corners of the sealing member and a region of the accommodation portion or the motor drive circuit corresponding to the corner.

6. The electrically-driven compressor according to claim 1, wherein:
the core includes an inner circumferential part extending toward the accommodation space from an inner circumference of the seal portion; and
the sealing member is positioned by contact of the inner circumferential part of the core with a contact portion arranged on an outer circumferential part of the motor drive circuit.

7. The electrically-driven compressor according to claim 6, wherein:
the sealing member has the shape of a polygonal frame and includes a plurality of corners; and
the positioning portion is arranged between each of two opposing corners of the sealing member and a region of the accommodation portion or the motor drive circuit corresponding to the corner.

8. The electrically-driven compressor according to claim 1, further comprising a groove portion arranged on the seal portion and an engagement projection arranged on at least one of the housing and the cover member and engageable with the groove portion.

9. The electrically-driven compressor according to claim 1, wherein:
the sealing member has the shape of a polygonal frame and includes a plurality of corners; and
the positioning portion is arranged between each of two opposing corners of the sealing member and a region of the accommodation portion or the motor drive circuit corresponding to the corner.

10. The electrically-driven compressor according to claim 9, wherein the positioning portion is arranged to extend along two sides forming the corner of the sealing member.

11. The electrically-driven compressor according to claim 1, wherein the accommodation space is formed by an accommodation cavity formed in at least one of the housing and the cover member.

12. An electrically-driven compressor comprising:
a housing;
an electric motor accommodated in the housing;
a compression mechanism accommodated in the housing and operated by the electric motor;
a cover member attached to the housing, wherein the housing and the cover member form an accommodation portion including an accommodation space therein;
a motor drive circuit, accommodated in the accommodation space, for driving the electric motor; and
a sealing member, arranged between the housing and the cover member, for sealing the accommodation space, wherein the sealing member includes an elastic seal portion that closely contacts the housing and the cover member and a shape sustaining member for sustaining the shape of the seal portion in conformance with a circumferential edge of the accommodation space, the shape sustaining member is shaped so that at least a circumferential edge part of the shape sustaining member is in conformance with the circumferential edge of the accommodation space, and the seal portion is forming integrally with the circumferential edge part of the shape sustaining member by arranging rubber material thereon, wherein the shape sustaining member includes a core having the shape of a frame and extending along the circumferential edge of the accommodation space,
the sealing member has the shape of a frame extending along the circumferential edge of the accommodation space,
a positioning portion for positioning the sealing member between the housing and the cover member by contacting or engaging the sealing member is arranged between the sealing member and the motor drive circuit,
the cover member and the motor drive circuit are integrated with each other,
the motor drive circuit includes a base and a circuit board,
the cover member and the base are made of aluminum,
the circuit board is fixed to the base,
the positioning portion is arranged on an outer circumferential end of the base and is extended to an upper side and a lower side of the base, and
the sealing member is attached to the cover member with the sealing member being in contact with an open end of the cover member and the positioning portion.

* * * * *